United States Patent Office 2,976,589
Patented Mar. 28, 1961

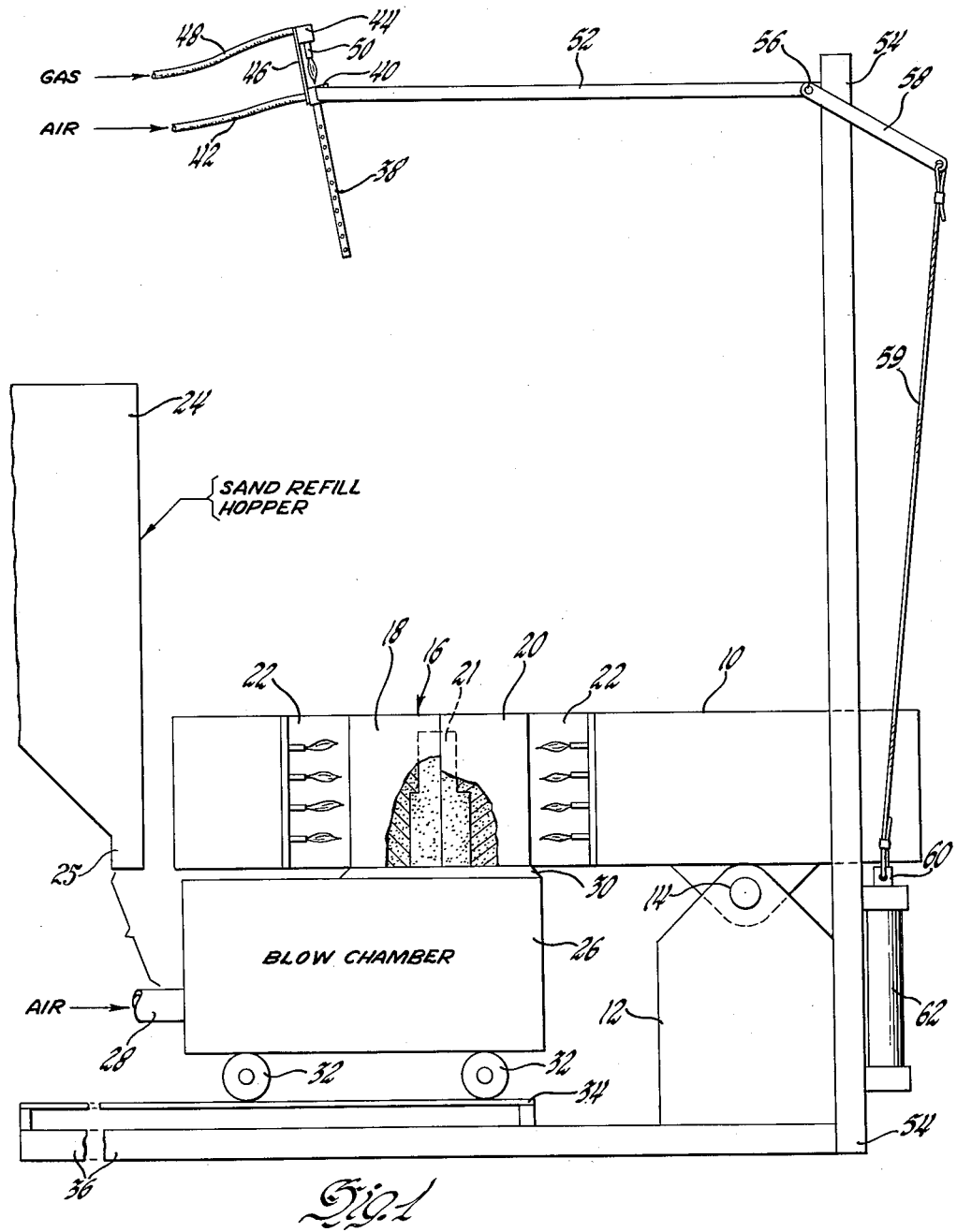

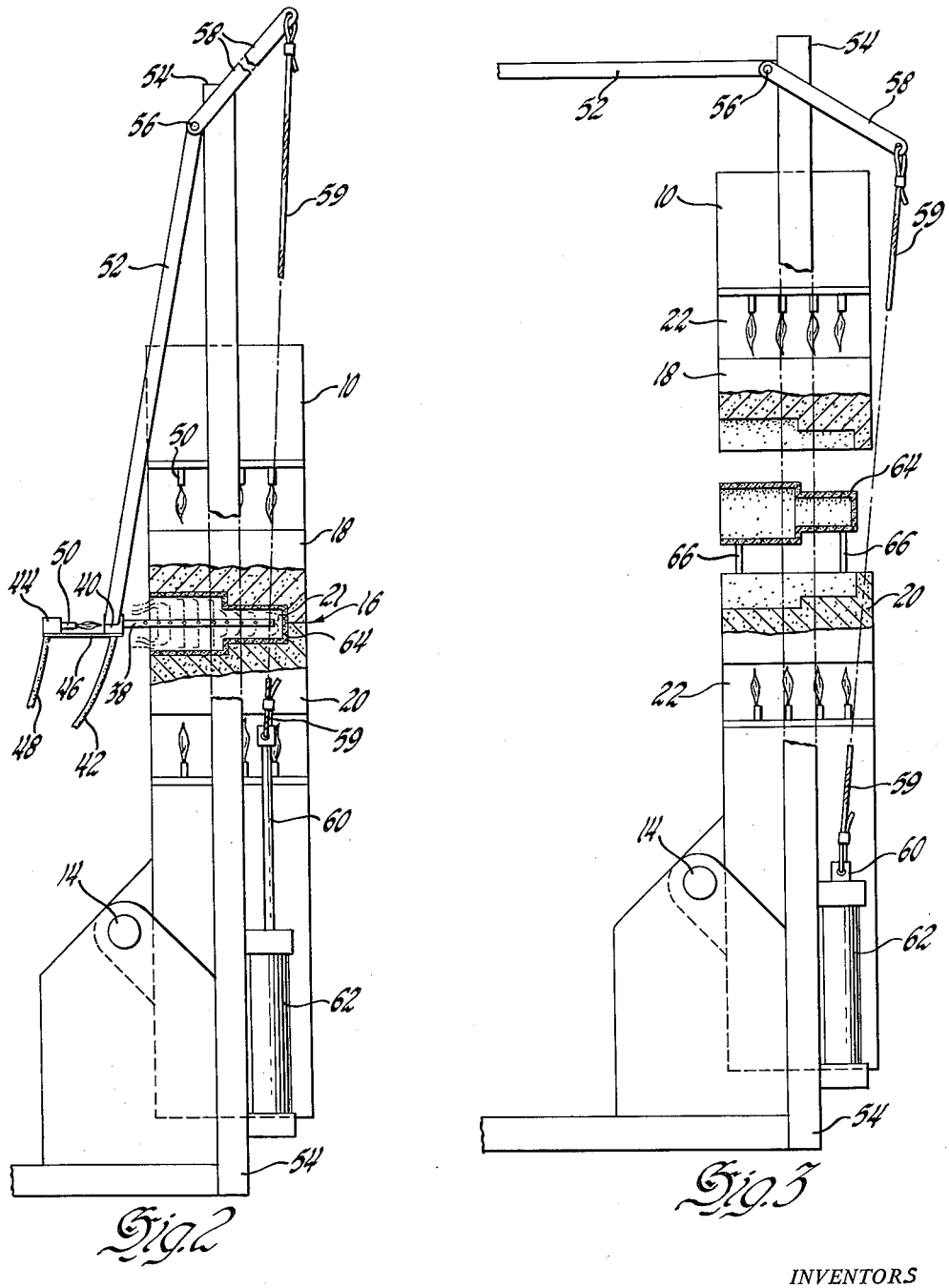

2,976,589

METHOD OF MAKING HOLLOW SHELL CORES

William S. Hackett and Merton L. Bartsch, Saginaw, Mich., assignors to General Motors Corporation, Detroit, Mich., a corporation of Delaware Filed July 7, 1958, Ser. No. 746,731
1 Claim. (Cl. 22—193)

This invention relates to shell type sand-resin molds and cores for use in metal casting operations and particularly to a process and apparatus for making hollow shell type cores.

Recently developed techniques in foundry practices incorporate the use of thin-walled shell molds and cores composed of sand and a resinous binder. These procedures generally referred to as "shell molding" processes are particularly suited to the production of precision or semi-precision castings in a wide variety of metals.

Essentially, the shell-molding process consists of using a thermosetting resin as a binder for the sand grains to form thin-walled molds or cores having a relatively high gas permeability, good surface smoothness and high dimensional stability. The molding material which is generally a dry mixture of a major proportion of silica sand and a minor proportion of a resin binder, is used in particulate form with no water being added. The molding material may also consist of sand particles coated with the curable thermosetting resin. Phenol formaldehyde, melamine formaledhyde, and urea formaldehyde resins are typical examples of a suitable thermosetting resin for use in these shell-molding procedures.

The sand-resin molds or cores are prepared by allowing the resin containing sand mixture to come into contact with a hot pattern or core box for a short period of time. A layer of the sand-resin mix adheres to the metal surface due to the melting of the resin which entraps the sand particles with which it is intimately mixed, thereby reproducing the pattern or core box surface detail. Metal patterns or core boxes are employed because they are subjected to elevated temperatures. Pattern or core box temperatures in the range from 250 to 500° F. are typical. Temperatures up to 800° F. may be advantageously employed under particular circumstances. The pattern or core box temperature and the length of time the molding mixture is permitted to remain in contact therewith determine the resulting thickness of the mold or core. Mold or core build-up times ranging from a few seconds to approximately a minute are appropriate for various applications.

After this short time interval the residual dry sand-resin mix is removed from the pattern or core box and the adhering sand-resin layer is preferably cured by heating it to a temperature within a range from about 300 to 600° F. for a relatively short period of time, usually from a few seconds to about five minutes, while in contact with the pattern or core box. After the curing operation, the mold or core is stripped from the pattern or core box.

Hollow cores are usually made in accordance with the aforementioned techniques by dumping a suitable quantity of a sand-resin mixture into a heated core box. After a predetermined time, sufficient to cause a layer of the desired thickness to adhere to the core box surface, the residual sand-resin mix is dumped out of the box and the resulting adhereing layer is permitted to remain in contact with the core box surface for a time sufficient to effect a cure of the resin and form a shell of sufficient strength and stiffness to make it suitable for the casting of metal thereagainst. Thereafter, the shell is stripped from the core box. In another method usually performed by automatic or semi-automatic apparatus, the heated core box is disposed over a sand-resin blowing chamber and the sand-resin mix is blown by means of compressed air against the hot interior surface of the core box for a time sufficient to cause the layer of a desired thickness to build up. After the sand-resin blowing operation, the residual sand is permitted to fall out of the core box and the adhering sand-resin layer is permitted to remain in contact with the core box until the resin is cured. The shell core is then stripped from the core box. In the above described procedures, the heat of the core box is utilized for supplying the heat necessary for curing the resin of the shell cores. Since the time necessary to satisfactorily cure the resin may range from about one to five minutes depending on the temperature of the core box and the thickness of the shell core, it is apparent that the final curing step is a limiting factor in the economical and efficient production of shell cores. The core box may, of course, be placed in a curing oven to accelerate the cure of the resin. However, this procedure is time consuming and requires a heating oven as well as equipment or man power for transferring the core box from the sand-resin mix blowing station into the oven.

It is the object of this invention to provide an improved process for making hollow shell cores which is economical and efficient and which requires a minimum expenditure in mechanical equipment and man power. It is a further object of the invention to provide apparatus for carrying out the process.

These and other objects are carried out by applying a sand-resin mix for a predetermined time to the interior surfaces of a core box heated to a predetermined degree whereby a relatively thin, partially cured adhering layer of a suitable thickness is formed over the heated core box surfaces and thereafter causing a stream of a gas heated to a predetermined temperature to impinge on the outer surfaces of the shell within the core box whereby the hot gas, together with the heated core box, is effective to rapidly and efficiently cure the formed shell core.

In a preferred embodiment of the invention, apparatus is provided including a support member movable between vertical and horizontal positions and carrying a heated core box; a sand-resin blowing means for blowing a sand-resin mix into the core box cavity when the core box is in a horizontal position; and a hot gas supplying nozzle means including means for inserting the nozzle within the core box cavity after a partially cured shell core has been formed therein and the core box has been moved to a vertical position.

In operation the typical shell core making cycle involves moving the supporting member to a horizontal position whereby the open end of the heated core box is disposed over an opening of the sand-resin blowing mechanism, blowing the sand-resin mix into the core box cavity for a time sufficient to cause a partially cured adhering layer of predetermined thickness to form on the surfaces of the core box cavity, then moving the support member away from the sand-resin blowing mechanism and inserting the hot gas blowing nozzle within the core box cavity whereby the hot gases are caused to impinge on the inner surface of the shell core and the core is rapidly cured due to the heat of the core box and the hot gas.

Other objects and advantages of this invention will more fully appear from the following description of a preferred embodiment of the invention shown in the accompanying drawings, in which:

Figure 1 is a schematic side view of a preferred apparatus embodying the invention shown in a position for initiating the process of the invention.

Figures 2 and 3 are fragmentary views of the apparatus of Figure 1 shown in positions for carrying out subsequent steps of the process.

Referring more particularly to the drawing, Figure 1 shows a preferred form of the apparatus suitable for carrying out the process of the invention. The apparatus is shown schematically for the sake of simplicity and clarity. The apparatus includes an elongated member 10 pivotally connected to a base member 12 by means of a shaft 14 or other suitable means whereby the support member 10 is movable between horizontal and vertical positions. The support member 10 carries a core box 16 consisting of a cope 18 and drag 20 including a cavity 21 and gas burner means 22 disposed about the outer surfaces of the core box 16 for heating the latter to and maintaining it at a predetermined temperature. The member 10 also includes means (not shown) for moving the cope 18 and drag 20 between open and closed positions.

The apparatus further includes a stationary sand-resin hopper 24 and a blow chamber 26. The latter includes a compressed air inlet means 28 and a vertically disposed opening 30. The blow chamber is mounted on wheels 32 which are on tracks 34 mounted on a horizontal portion 36 of the base 12 and is reciprocally movable between a position in which the opening 30 thereof is under the cavity 21 when the support member 10 is horizontal and a position in which the opening 30 is disposed under the outlet 25 of the hopper 24.

An important feature of the apparatus is a hot air blowing means including a nozzle 38, means for supplying hot air to the nozzle, and means for supporting and moving the nozzle to a position within the cavity 26 of the core box when the support member 10 is in a vertical position, as is shown in Figure 2. As shown more clearly in Figure 1 the nozzle 38 preferably consists of a perforated tube having a plurality of openings of approximately 1/8" in diameter which are connected to a hot air manifold 40 in fluid flow relationship. The latter is in turn connected in fluid flow relationship to a compressed air supply (not shown) by means of a flexible conduit 42. Connected to the hot air manifold 40 by means of a bracket 46 is a combustible gas manifold 44. The combustible gas is supplied to the manifold 44 by means of a flexible conduit 48. A gas burner nozzle or jet 50 is connected to the manifold 44 in gas flow relationship and is arranged so as to cause the heat produced thereby to heat the air manifold 40 as shown. The hot air blowing means is connected to an arm 52 pivotally connected to a vertical portion 54 of the base 12 by means of a shaft 56 or other suitable means. The arm 52 is in turn rigidly connected to a crank 58 which in turn is connected by means of a cable 59 or other suitable means to the connecting rod 60 of a hydraulic piston and cylinder assembly 62 mounted on the vertical portion 54 of the base. It is readily apparent that a vertical movement of the connecting rod 60 in an upward direction is operative to move the nozzle 38 between positions within the cavity 26 of the core box as shown in Figure 2 and an upwardly extending position whereby the horizontal member 10 may be moved from a horizontal to a vertical position without obstruction from the arm 52 and the heat supplying means attached thereto.

In carrying out the process of the invention the blow chamber 26 is suitably loaded by means of the hopper 24 with a sand-resin mix suitable for making shell cores. A satisfactory mix may consist of about 3½% of heat curable phenol-formaldehyde resin, about 5 parts of silica flour and the balance a silica sand such as Juniata sand having an AFS fineness of about 100.

Meanwhile the core box 16 has been heated to a temperature preferably of from 425 to 475° F. by means of the gas burners 22. The support member 10 is then lowered to a horizontal position whereby the open end of the cavity 16 is disposed over the opening 30 of the blow chamber 26. The core box 16 and the blow chamber opening 30 are provided with a suitable mating surface so that a suitable seal is provided between the parts when they are in engagement. Air under pressure is then introduced into the blow chamber 26 whereby the sand-resin mix is caused to be blown up against the hot interior surfaces of the core box. As is well known in the art, the resin of the sand-resin mix is caused to melt as it strikes the hot core box surfaces whereby a thin adherent layer 64 or shell of the sand-resin mix is formed on the core box surface. After a layer of about ¼" has been built up, a matter of a few seconds, the blowing operation is terminated and the member 10 is raised to a vertical position as shown in Figure 2. As soon as the member 10 has been moved to a vertical position, the hydraulic cylinder 62 is actuated so that the connecting rod 60 is moved upwardly a sufficient distance to allow the nozzle 38 to enter the core box cavity 21 to a point such that the walls of the shell core are more or less centrally located about the nozzle 38. As shown in Figure 2 the hot air is caused to impinge substantially uniformly on the inner surfaces of the shell core 64. The gas jet 50 is adjusted to heat the air within the air manifold 40 to a temperature ranging from 350 to 1300° and preferably in a range from 400 to 800°. In the specific embodiment described herein, a hot air temperature of 600° F. provides satisfactory results. The hot air issuing from the nozzle 38, together with the heat from the core box, is effective to satisfactorily cure the shell core in about 30 seconds. Hot burning gases such as commercial heating gases may be substituted for the hot air in the above described apparatus. However, it is preferred to use hot air for curing the shell core since the hot burning gases tend to produce localized hot spots with the result that the heat is not applied uniformly to the surfaces of the shell core, and hence the shell core is not cured uniformly and, in some instances, undue burning of the resin in the shell core may result.

To achieve the most efficient curing rate of the shell core, the velocity of hot air issuing from the nozzle openings is substantially the highest possible rate without blowing away significant quantities of sand from the shell core. In the instant example, the nozzle 38 is provided with 1/8" openings for use in curing a core having a maximum diameter of about 3". A satisfactory curing rate with no adverse effects of the shell core is achieved by moving of about 8 to 10 cubic feet per minute of hot air throught the nozzle 38.

After the shell core 64 has been satisfactorily cured, the hydraulic mechanism 62 is actuated to cause the connecting rod 60 to move downwardly whereby the nozzle 38 is removed from the core and into a non-obstructing position. The cope and drag members 18 and 20 are then caused to part as shown in Figure 3, whereby the cured core 64 is left supported on the ejection pin 66. After the core is removed from the mechanism by any suitable means, the apparatus is then in condition for another core making cycle. It is to be understood that although the apparatus of the invention has been described in terms of a single core blowing unit, the support member 10 preferably carries a plurality of core boxes positioned side by side and the arm 52 carries a corresponding member of nozzle 38 connected to a common hot air manifold 40. Similarly, the jet burners 50 are preferably connected to a common gas manifold 44 and the blow chamber 26 includes a corresponding number of blow openings 30.

The apparatus is also preferably provided with control means (not shown) whereby the core making and curing operation may be performed automatically. To this end power and control means are provided to sequentially move the support means 10 from a vertical to a horizontal position whereby the core box cavity 21 is disposed over the blow chamber opening 30 while the arm 52 maintains the hot gas providing mechanism in a non-obstructed position to blow the sand-resin mix into the core box cavity for a time sufficient to form the desired sand-resin layer, to cause the support member 10 to be raised to a vertical position after and as soon as the shell forming operation has been accomplished, to actuate the hydraulic mechanism 62 to cause insertion of the nozzle 38 into the core box cavity as soon as the support member 10 reaches a vertical position and, after a predetermined time necessary to cure the shell core, to raise the arm 52 to an elevated position and effect the separation of the cope and drag. The blow chamber 26 is preferably designed to contain more sand-resin mix than is necessary for the formation of a single set of shell cores and the chamber is preferably replenished periodically from the hopper 24.

Various modifications in the arrangement and details of the specific embodiment described and shown herein will be apparent to those skilled in the art and are contemplated as within the scope of the present invention as defined in the claim appended hereto.

We claim:

A process for producing a hollow shell-type foundry core comprising heating a metal core box to a temperature of about 250° F. to 800° F., depositing a sand-resin mix onto the interior surfaces of said core box to form thereon an adherent sand-resin layer of predetermined thickness, inserting a nozzle into said core box and forcibly blowing a substantially uniform stream of hot gas through said nozzle and into said layer for a time sufficient to cure said layer while simultaneously applying heat through said core box to the surfaces of said layer which abut said core box, said gas being at a temperature of about 350° F. to 1300° F. when blown into said layer.

References Cited in the file of this patent

UNITED STATES PATENTS

| | | |
|---|---|---|
| 2,496,170 | Mann | Jan. 31, 1950 |
| 2,815,550 | Valyi | Dec. 10, 1957 |

FOREIGN PATENTS

| | | |
|---|---|---|
| 1,092,003 | France | Nov. 3, 1954 |
| 1,097,027 | France | Feb. 9, 1955 |

OTHER REFERENCES

Foundry, pages 114–116, December 1953.
American Foundryman, page 142, May 1954.
The Foundry, vol. 78, No. 10, pages 162 and 164, October 1950.
The Foundry, pages 162, 164 and 168, October 1950.
Foundry Trade Journal, pages 507–518, June 28, 1956.